United States Patent [19]

Sato

[11] Patent Number: 5,053,759
[45] Date of Patent: Oct. 1, 1991

[54] METHOD OF AND APPARATUS FOR GENERATING HIGH-QUALITY PATTERN

[75] Inventor: Fumitaka Sato, Tokyo, Japan

[73] Assignee: Kabushiki Kaisha Toshiba, Kawasaki, Japan

[21] Appl. No.: 302,710

[22] Filed: Jan. 27, 1989

[30] Foreign Application Priority Data

Jan. 30, 1988 [JP] Japan .................................. 63-20315
Nov. 18, 1988 [JP] Japan ................................ 63-290147

[51] Int. Cl.$^5$ ............................................. G09G 5/00
[52] U.S. Cl. .................................. 340/723; 340/748; 364/518
[58] Field of Search ............... 340/731, 723, 735, 748, 340/751, 730, 728, 790; 365/518, 521, 522

[56] References Cited

U.S. PATENT DOCUMENTS

| | | | |
|---|---|---|---|
| 4,298,945 | 11/1981 | Kyte et al. | 340/730 |
| 4,338,673 | 7/1982 | Brown | 340/731 |
| 4,346,377 | 8/1982 | Green | 340/731 |
| 4,748,443 | 5/1988 | Uehara et al. | 340/731 |
| 4,774,508 | 9/1988 | Kitahara et al. | 340/735 |
| 4,785,391 | 11/1988 | Apley et al. | 340/730 |
| 4,815,009 | 3/1989 | Blatin | 340/734 |

Primary Examiner—Jeffery A. Brier
Attorney, Agent, or Firm—Finnegan, Henderson, Farabow, Garrett, and Dunner

[57] ABSTRACT

An apparatus for generating a high-quality pattern comprises a code pattern memory for storing a plurality of first winding number (WN) codes, a projection section responsive to an input projection start command, for projecting at least one size change contour line of input size changed contour line data for defining an area of the pattern in the code pattern memory while updating the first WN codes with second WN codes determined in accordance with a drawing direction of the size changed contour line and a filling direction in units of dots representing the size changed contour line, and for generating a projection end response upon completion of projection of the size changed contour line, a filling section responsive to an input filling start command, for filling the area in accordance with the first WN codes read out from the code pattern memory obtain the pattern, and a controller for outputting the projection start command to the projection section in response to an input pattern generation instruction and for outputting the filling start command to the filling section in response to the projection end response.

36 Claims, 10 Drawing Sheets

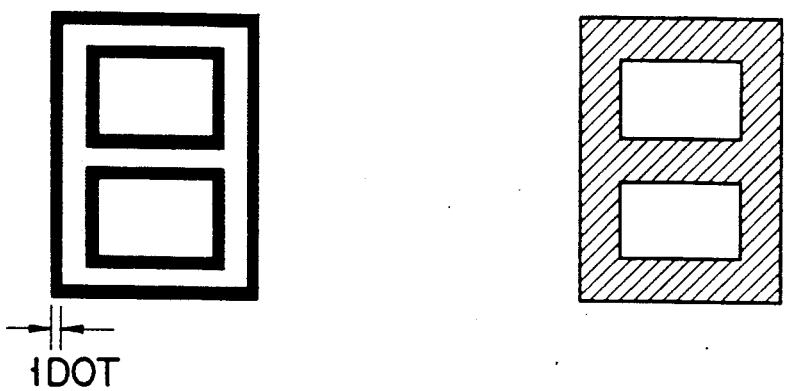
FIG. 1A　　　　　FIG. 1B
(PRIOR ART)　　(PRIOR ART)
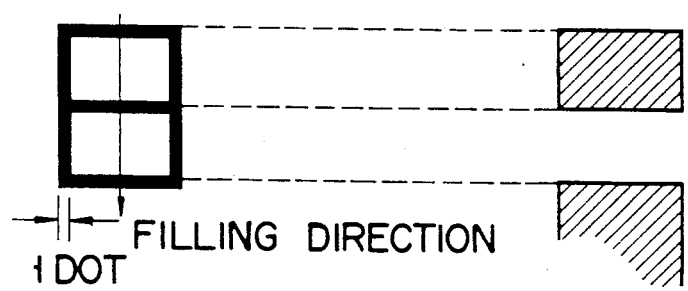
FIG. 1C　　　　　FIG. 1D
(PRIOR ART)　　(PRIOR ART)
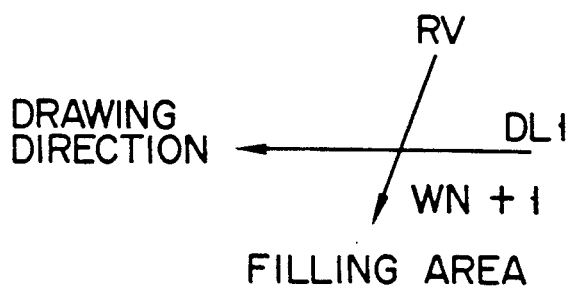　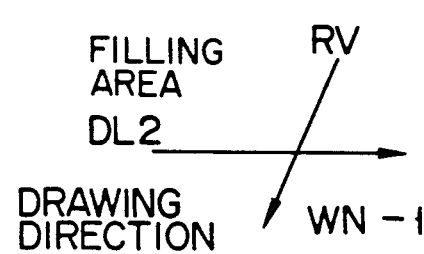
FIG. 2A　　　　　FIG. 2B
(PRIOR ART)　　(PRIOR ART)

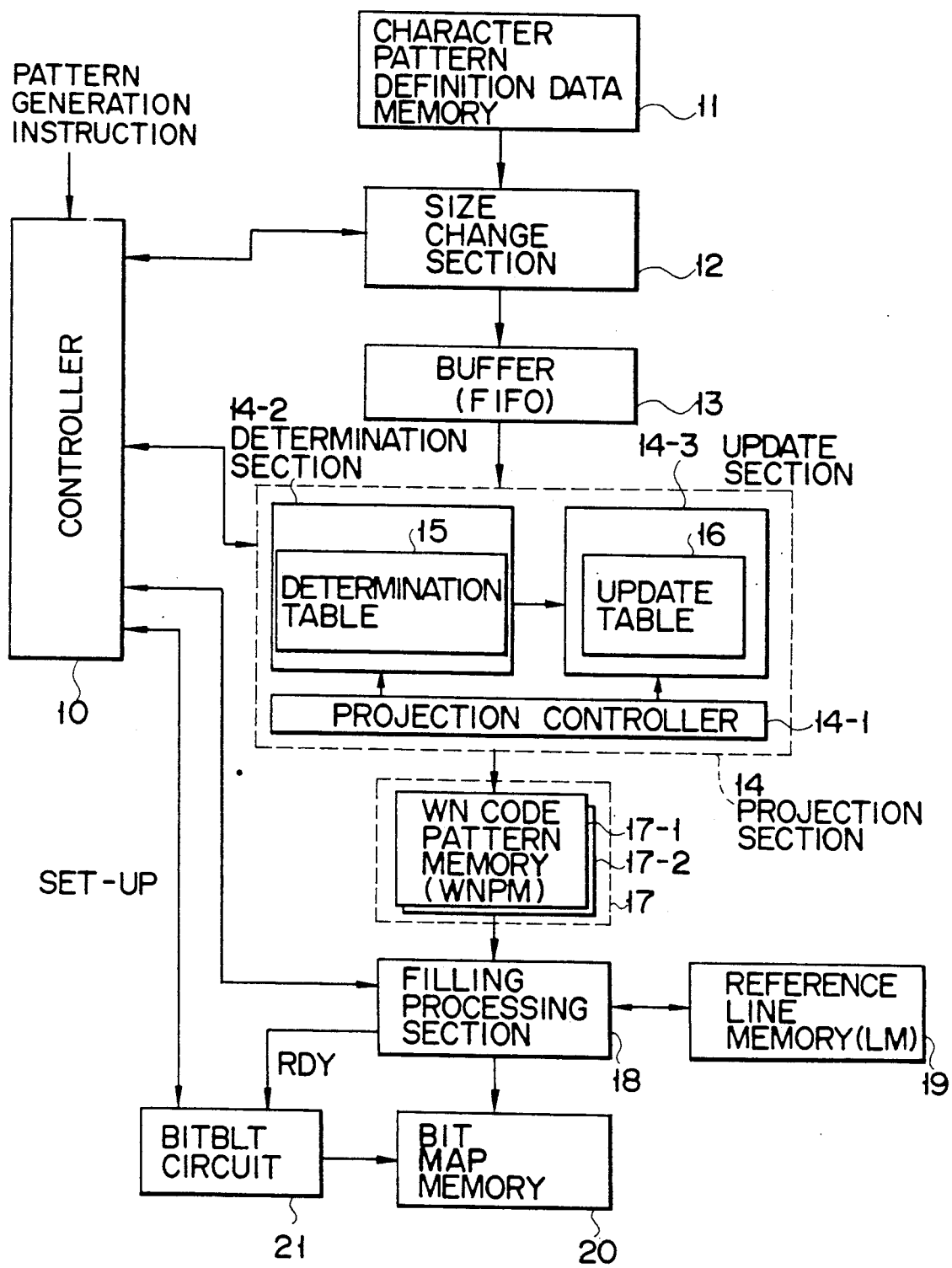
F I G. 3

| SEGMENT OUTGOING DIRECTION \ SEGMENT INCOMING DIRECTION | →• | ↗ | ↑ | ↖ | •← | ↙ | ↓ | ↘ |
|---|---|---|---|---|---|---|---|---|
| •→ | − | − | 0 | 0 | ± | ± | − | − |
| ↗ | − | − | 0 | 0 | 0 | ± | − | − |
| ↑ | − | − | 0 | 0 | 0 | 0 | − | − |
| ↖ | ± | ± | + | + | + | + | 0 | ± |
| ←• | ± | ± | + | + | + | + | 0 | 0 |
| ↙ | 0 | ± | + | + | + | + | 0 | 0 |
| ↓ | 0 | 0 | + | + | + | + | 0 | 0 |
| ↘ | − | − | 0 | ± | ± | ± | − | − |

F I G. 5

| DETERMINED WN CODE \ WN CODE FROM WNPM | −3 | −2 | −1 | 0 | 1 | 2 | 3 | ± |
|---|---|---|---|---|---|---|---|---|
| 0 | −3 | −2 | −1 | 0 | 1 | 2 | 3 | ± |
| + | −2 | −1 | ± | 1 | 2 | 3 | ✗ | 1 |
| − | ✗ | −3 | −2 | −1 | ± | 1 | 2 | −1 |
| ± | −3 | −2 | −1 | ± | 1 | 2 | 3 | ± |

F I G. 6

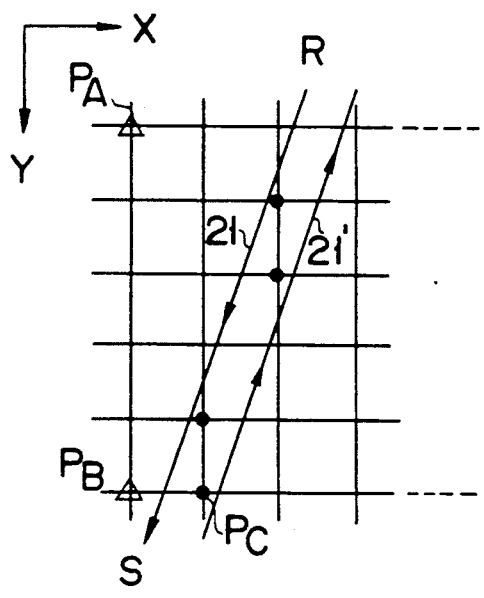
F I G. 10A
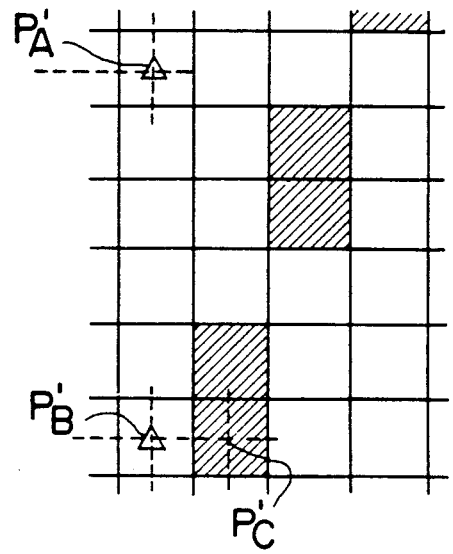
F I G. 10B
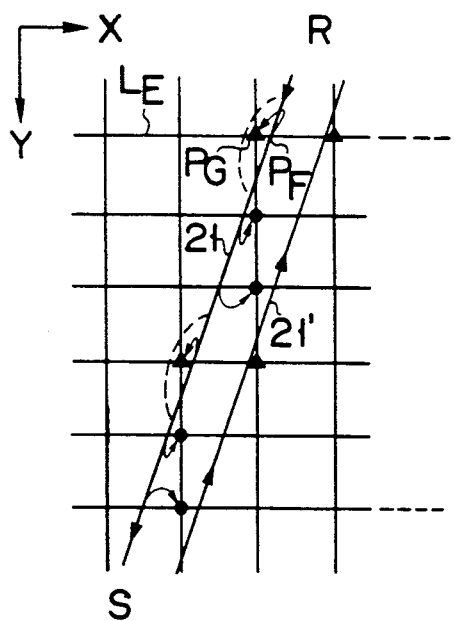
F I G. 10C
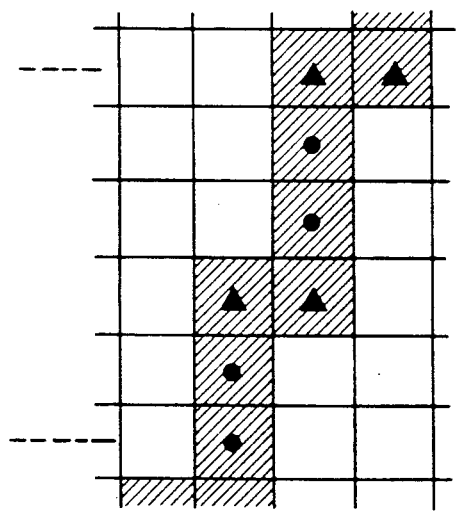
F I G. 10D

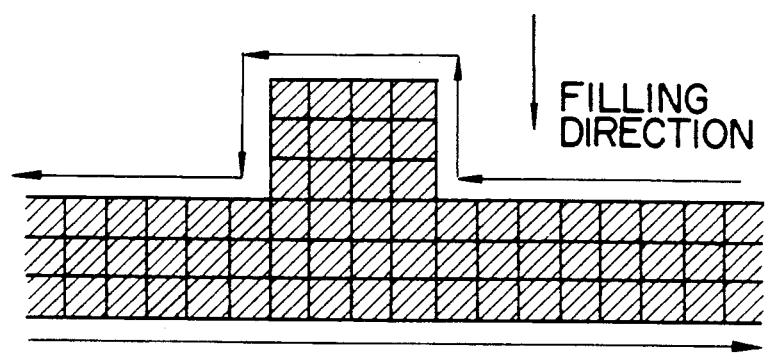
FIG. 12A
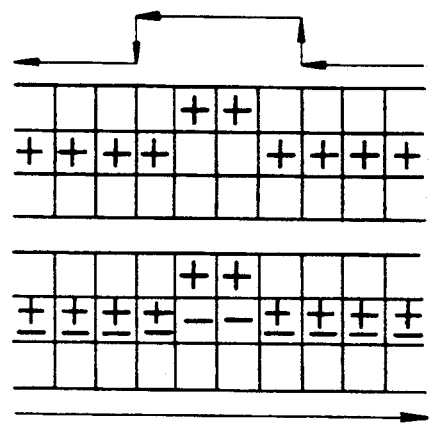
FIG. 12B
FIG. 12C
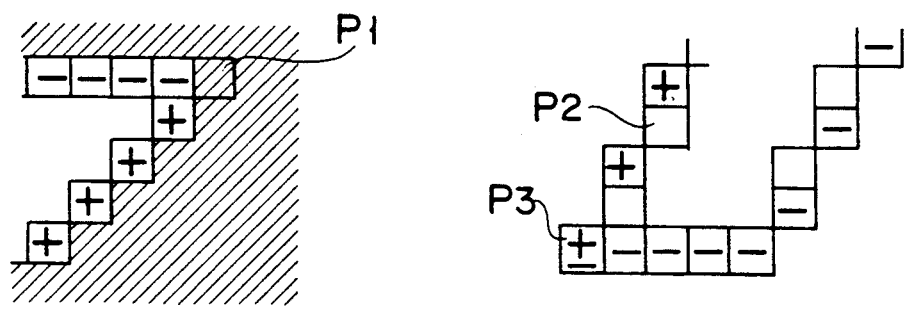
FIG. 14A
FIG. 14B

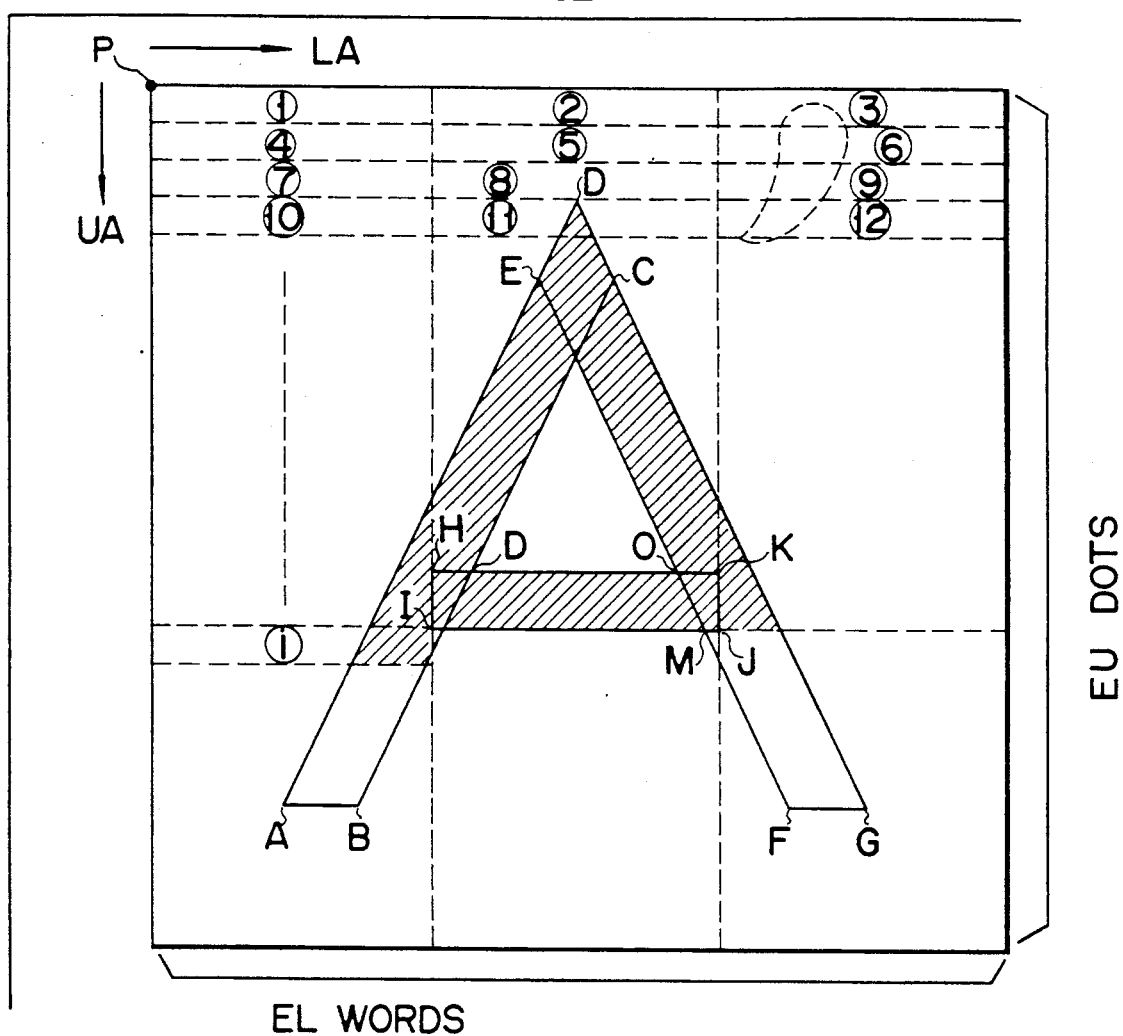
FIG. 13
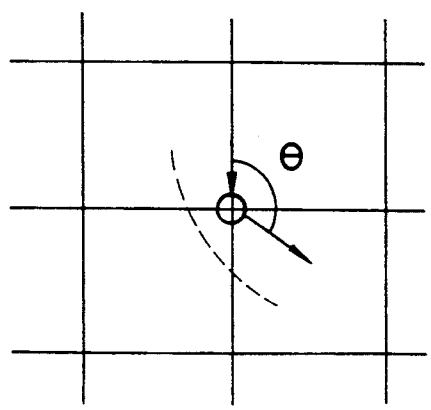
FIG. 15
FIG. 16

METHOD OF AND APPARATUS FOR GENERATING HIGH-QUALITY PATTERN

BACKGROUND OF THE INVENTION

1. Field of the Invention

The present invention relates to a method of and apparatus for generating a high-quality pattern in accordance with a contour defining a pattern, e.g., a character pattern.

2. Description of the Related Art

According to a conventional technique for generating a pattern, a contour is drawn and an area inside the contour is filled. The following three techniques are known as techniques for filling an area defined by a contour.

According to a first technique, a dot is continuously moved from a dot designated inside a defined area, and each dot is determined to be located "inside" or "outside" the area. Any dot located inside the area is subjected to filling. This technique is used in graphic processing in a personal computer or the like. Each dot is determined to be located inside or outside the area. Therefore, processing time is undesirably long. In addition, "backward" processing is required at a branch for filling on the basis of "continuity of an area".

According to the second technique, a bit map memory for storing a contour is scanned in a predetermined direction (i.e., a filling direction) to fill dots with "1"s between an odd-numbered "1" dot and an even-numbered "1" dot (i.e., even-odd filling). "Backward processing" is not required in this technique. For example, if the number of dots of a contour in a filling direction is one (this tip is defined as a one dot tip), dots from the one-dot tip are undesirably filled. In order to eliminate this inconvenience, generation of a one-dot tip (i.e., a tip having one dot in a direction perpendicular to the filling direction is not called a one-dot tip) must be prevented at the time of character pattern design, resulting in a cumbersome operation. When a one-dot tip is required, a character pattern having no one-dot tip is generated by filling, and then the contour of the character pattern must be drawn on the character pattern having n one-dot tip.

According to the second technique, if contours of character patterns do not overlap each other, as shown in FIG. 1A, an accurate character pattern can be obtained, as shown in FIG. 1B. However, when contour lines overlap on a given lattice line due to pattern reduction to constitute a one-dot line width, as shown in FIG. 1C, a wrong character pattern shown in FIG. 1D is generated. The filling direction in FIGS. 1B and 1D is defined as the Y direction (downward direction).

The third technique is a non-zero winding number technique used in the Post Script as a page description language developed by Adobe Systems Inc. As shown in FIGS. 2A and 2B, when a drawing direction of a contour is directed from the left to the right with respect to a vector from an infinite, e.g., vector RV representing the filling direction, winding number WN is incremented by one. However, when the drawing direction of the contour is directed from the right to the left, winding number WN is decremented by one.

According to the third technique, each segment constituting a character contour is sorted and listed with reference to, e.g., a y-coordinate of a start dot. When a "FILL" command is executed, a program loop for scanning downward along scan line parallel to the x-axis is made, and all intersections between the scan lines parallel to the x-axis and the segments in the list are obtained for each loop. The descriptors of the segments are checked in an order of x-coordinates of the intersections to determine a direction in which each line is directed (i.e., upward or downward). A winding number (to be referred to as data WN hereinafter) is obtained. A line corresponding to a non-zero interval of data WN is drawn in the bit map memory. According to the third technique, the above operations are repeated by the above program loop.

As described above, the segment list must be checked in units of lines constituting the contour. For this reason, a long processing time is required for a complicated pattern such as a Chinese character pattern having a long segment list. In addition, the calculation of the intersections must be repeated for a number of times roughly corresponding to a "total number of dots of a contour".

As described above, a character pattern having a one-dot width or a one-dot tip cannot be accurately generated by the even-odd filling. High-speed processing cannot be performed by non-zero winding number filling. In addition, filling is performed in units of dots by the above two techniques, and the processing time cannot be shortened.

SUMMARY OF THE INVENTION

The present invention has been made in consideration of the above situation, and has as its object to provide a method and apparatus capable of accurately generating a pattern having a one-dot width or a one-dot tip and capable of generating a complicated pattern at high speed In order to achieve the above object according to an aspect of the present invention, there is provided an apparatus comprising a pattern memory for storing a pattern, a code pattern memory for storing first winding number (WN) codes, a projection section responsive to an input projection start command, for projecting at least one size changed contour line of input size changed contour line data for defining an area of the pattern, in the code pattern memory while updating the first WN codes with second WN codes determined in accordance with a drawing direction of the size changed contour line and a filling direction in units of dots representing the size changed contour line, and for generating a projection end response upon completion of projection of the size changed contour line, a filling section responsive to an input filling start command, for filling the area in the pattern memory in accordance with the first WN codes read out from the code pattern memory to obtain the pattern, and a controller for outputting the projection start command to the projection section in response to an input pattern generation instruction and for outputting the filling start command to the filling section in response to the projection end response from the projection section.

In order to achieve the above object according to another aspect of the present invention, there is provided a method of generating a high-quality pattern, comprising obtaining a WN code, representing a difference between winding number (WN) data of each of dots obtained by projecting the contour lines and a dot adjacent to each dot in a direction opposite to a filling direction, in accordance with a drawing direction of the size changed contour line and the filling direction, obtaining filling data of an object dot from the WN code of the object dot and the WN data of the adjacent dot in the direction opposite to the filling direction, and filling the object dot in accordance with the filling data of the object dot.

According to the present invention as described above, when at least one contour line defining one pattern is drawn once, the differences of the WN data on dots representing the contour line can be obtained in the WN code pattern memory. The WN data and filling data of each dot can be easily obtained from the WN code stored in the WN code pattern memory. Therefore, high-speed processing can be performed as compared with the conventional non-zero winding number technique. The WN code can express a specific state indicating overlap of dots. Correct WN data can be obtained in consideration of the above specific state, and therefore filling data can be generated. A pattern having a one-dot tip or having a thin line can be accurately generated.

The WN data are obtained in units of N dots continuous in a line direction perpendicular to the filling direction. When WN data of one line are obtained, the WN data is used for the next line. Therefore, in accordance with simple address control, filling data dots obtained simultaneously with the WN data can be transferred in units of N dots to the bit map memory, while addresses are being updated in the line direction.

BRIEF DESCRIPTION OF THE DRAWINGS

FIGS. 1A to 1D are views for explaining patterns generated by conventional techniques;

FIGS. 2A and 2B are views for explaining winding number (WN) data;

FIG. 3 is a block diagram of a high-quality pattern generator according to a first embodiment of the present invention;

FIG. 5 is a view showing contents of determination table 15 shown in FIG. 3;

FIG. 6 is a view showing contents of update table 16 shown in FIG. 3;

FIGS. 10A to 10D are views for explaining a problem posed by reduction of a thin pattern and DDA plotting for solving this problem;

FIG. 12A is a view showing a relationship between a pattern and WN codes;

FIGS. 12B and 12C are views showing changes in WN codes when a pattern shown in FIG. 12A is reduced into ½;

FIG. 13 is a view for explaining processing procedures of the filling processing section in correspondence with a memory space of bit map memory 20 shown in FIG. 3;

FIGS. 14A and 14B are views showing a pattern in which update processing of the WN code can be omitted and a pattern having a one-dot tip, respectively;

FIG. 15 is a view for explaining contents of the determination table; and

FIG. 16 is a view for explaining contents of a determination table according to a second embodiment.

DETAILED DESCRIPTION OF THE PREFERRED EMBODIMENTS

A high-quality character pattern generator according to the present invention will be described in detail with reference to the accompanying drawings.

Figure 4:
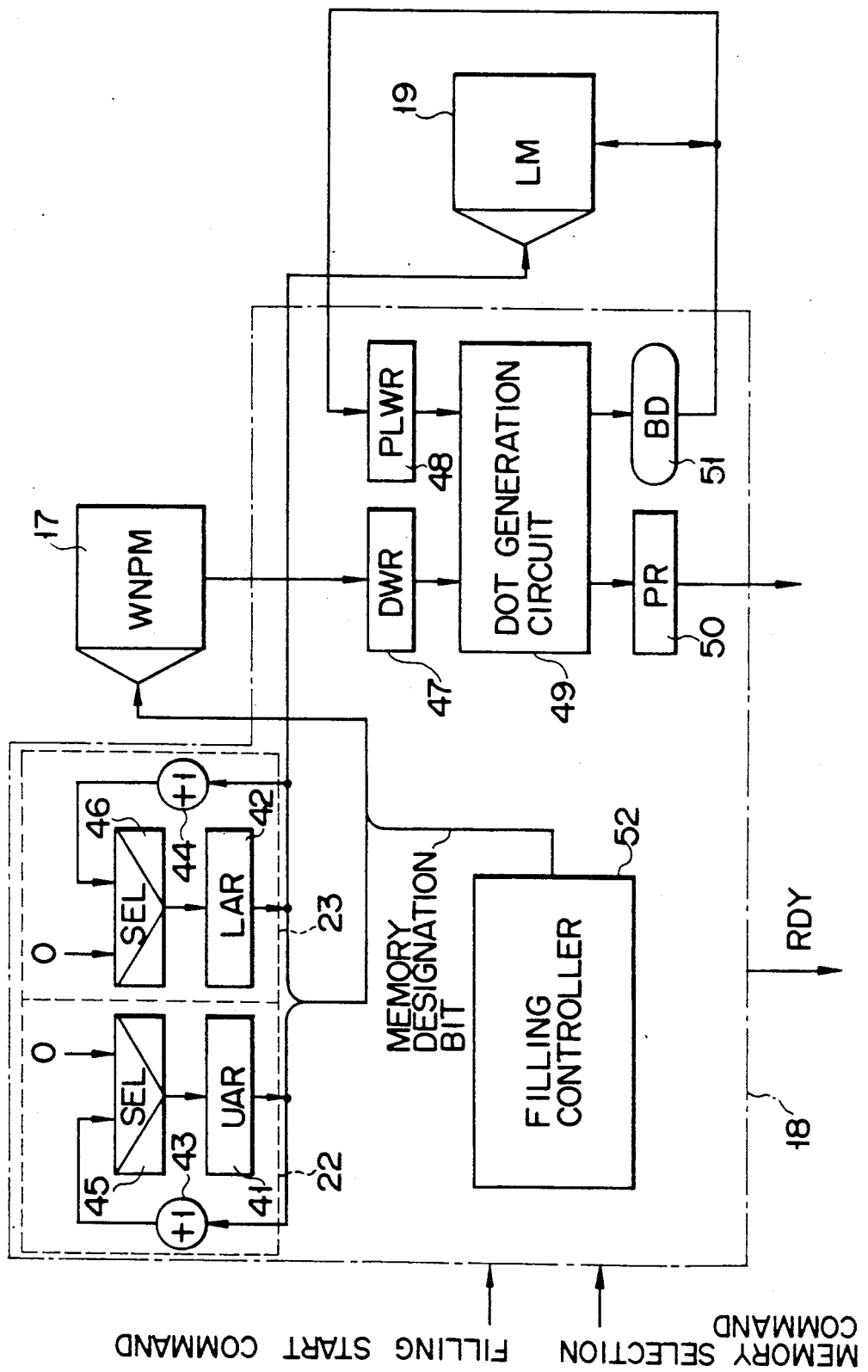
FIG. 4 is a block diagram showing filling processing section 18 and the peripheral circuits.

An arrangement of a high-quality character pattern generator according to a first embodiment of the present invention will be described with reference to FIGS. 3 and 4. In the first embodiment, overlapping of a maximum of three partial patterns is allowed in part of a character pattern.

Referring to FIG. 3, pattern definition data which defines each character pattern having a standard size is stored in character pattern definition data memory 11. Each character pattern includes at least one pattern, and each pattern includes at least one partial pattern. Each partial pattern is defined by a contour line. The contour line is a straight and/or curved line. In this embodiment, a contour defined by contour lines is closed. A contour drawing direction is a direction in which a filling area is viewed to the left, as defined in the Post Script as previously described. A filling direction is the y-axis in this embodiment. However, the filling area and the filling direction are not limited to those described above, but can be arbitrarily selected. For example, a contour may be drawn in a direction where a filling area is viewed to the right, and the filling direction may be the x-axis.

The pattern definition data includes data representing the number of patterns constituting a character, contour count data N representing the number of partial patterns, i.e., the number of contour lines constituting each pattern, and contour line data representing each contour line defining one partial pattern. Contour line data represents a contour line constituted by a straight and/or curved line. A character pattern shown in FIG. 9 includes patterns PA and PB. Pattern PA includes three partial patterns PA-1, PA-2, and PA-3. The number of partial patterns constituting pattern PB is one. Partial pattern PA-1 is defined by lines AB, BC, CD, and DA. Partial pattern PA-2 is defined by lines FG, GD, DE, and EF. Partial pattern PA-3 is defined by lines IJ, JK, KH, and HI. Partial patterns PA-1 and PA-3 overlap each other in area IUVH. Overlapping of a maximum of three partial patterns is allowed in the first embodiment.

Size change section 12 reads out the pattern definition data from memory 11 in accordance with a size change command from controller 10 and enlarges/reduces the readout pattern definition data so as to obtain a size designated by the size change command. The enlarged/reduced pattern definition data is output to first-in first-out buffer FIFO 13. FIFO 13 temporarily stores the pattern definition data from size change section 12.

In response to a projection start command from controller 10, projection section 14 projects each contour line determined by the contour line data in the pattern definition data from FIFO 13 into WN code pattern memory WNPA 17 in units of contour dots. Each contour dot is an intersection between the contour line and a lattice line of coordinates subjected to projection, or a lattice dot close to this intersection. Each contour dot has a winding number (WN) code. When projection of one pattern is completed, projection section 14 outputs a projection end response to controller 10. Projection section 14 comprises projection controller 14-1, determination section 14-2, and update section 14-3. Controller 14-1 controls operations of determination section 14-2 and update section 14-3 in accordance with commands from controller 10. Determination section 14-2 determines a WN code of each contour dot (i.e., object dot) in response to the command from controller 14-1. Update section 14-3 updates the WN code of the object dot stored in WNPM 17 in accordance with the WN code determined by determination section 14-2.

Determination section 14-2 has determination table 15 for determining the WN code. Determination table 15 outputs the WN code of the object dot in accordance with an incoming direction of a contour line segment to the object dot and an outgoing direction from the object dot. Determination section 14-2 determines the WN code of the object dot by referring to determination table 15 on the basis of the contour line data from FIFO 13 in response to a determination command from controller 14-1. The WN code is a code representing a difference between winding number data WN of the object dot and a dot adjacent to the object dot in a direction opposite to the filling direction, i.e., the upper adjacent dot to the object dot in this embodiment.

The WN codes and determination table 15 will be described in detail below.

Eight WN codes are prepared in this embodiment. The first WN code is "0" which represents that data WN of the object dot is equal to data WN of the dot upper adjacent to the object dot. The second, third, and fourth WN codes are "+1", "+2", and "+3" which represent that data WN of the object dot is larger than data WN of the upper adjacent dot by 1, 2, and 3, respectively. The fifth, sixth, and seventh WN codes are "−1", "−2", and "−3" which represent that data WN of the object dot is smaller than data WN of the upper adjacent dot by 1, 2, and 3, respectively. The eighth WN code is "±" which represents that data WN of an upper adjacent dot is equal to data WN of a lower adjacent dot in the filling direction, but data WN of the object dot is different from data WN of the upper or lower adjacent dot by 1. Since overlapping of a maximum of three contours is allowed in character pattern generation in this embodiment, eight WN codes, i.e., "−3" to "+3" and "±" must be prepared. Therefore, each WN code is expressed by a 3-bit code. It should be noted that only four WN codes (i.e., "−1" to "+1" and "±") are used in determination table 15 since determination section 14-2 processes one contour each time.

FIG. 5 shows contents of determination table 15. Referring to FIG. 5, black dot "·" represents an object dot, and arrow "→" represents a contour line segment drawing direction. More specifically, arrow "→" toward the black dot represents a segment incoming direction, i.e., a direction of a contour line segment from the previous object dot to the current object dot, and array "→" away from the black dot represents a segment outgoing direction, i.e., a direction from the current object dot to the next object dot. The segment direction is quantized in units of 45° and is classified into one of eight codes caled direction codes. Projection section 14 refers to determination table 15 in accordance with the two determined direction codes, i.e., segment incoming and outgoing direction codes, and determines the WN code. In the following description, the angular reference is the filling direction, i.e., the y direction.

1) If the incoming direction code represents a 90° direction, and angle $\theta$ of the outgoing direction code falls within the range of $0° < \theta \leq 180°$, code "−" (−1) is determined as the WN code; if the incoming direction code represents a 90° direction and angle $\theta$ of the outgoing direction code falls within the range of $225° \leq \theta \leq 270°$, code "±" is determined as the WN code; and if the incoming direction code represents a 90° direction, and angle 8 of the outgoing direction code falls within the range of $315° \leq \theta \leq 360°$, code "0" is determined as the WN code.

2) If the incoming direction code represents a 135° direction, and angle 0 of the outgoing direction code falls within the range of $0° < \theta \leq 180°$, code "−" is determined as the WN code; if the incoming direction code represents a 135° direction and angle $\theta$ of the outgoing direction code falls within the range of $225° \leq \theta \leq 315°$, code "±" is determined as the WN code; and if the incoming direction code represents a 135° direction, and angle 8 of the outgoing direction code is 360°, code "0" is determined as the WN code.

3) If the incoming direction code represents a 180° direction, and angle $\theta$ of the outgoing direction code falls within the range of $0° < \theta \leq 180°$, code "0" is determined as the WN code; and if the incoming direction code represents a 180° direction and angle $\theta$ of the outgoing direction code falls within the range of $225° \leq \theta \leq 360°$, code "+" (+1) is determined as the WN code.

4) If the incoming direction code represents a 225° direction, and angle $\theta$ of the outgoing direction code is 45°, code "±" is determined as the WN code; if the incoming direction code represents a 225° direction and angle $\theta$ of the outgoing direction code falls within the range of $90° \leq \theta \leq 180°$, code "0" is determined as the WN code; and if the incoming direction code represents a 225° direction, and angle $\theta$ of the outgoing direction code falls within the range of $225° \leq \theta \leq 360°$, code "+" is determined as the WN code.

5) If the incoming direction code represents a 270° direction, and angle 8 of the outgoing direction code falls within the range of $45° \leq \theta \leq 90°$, code "±" is determined as the WN code; if the incoming direction code represents a 270° direction and angle $\theta$ of the outgoing direction code falls within the range of $135° \leq \theta \leq 180°$, code "0" is determined as the WN code; and if the incoming direction code represents a 270° direction, and angle $\theta$ of the outgoing direction code falls within the range of $225° \leq \theta \leq 360°$, code "+" is determined as the WN code.

6) If the incoming direction code represents a 315° direction, and angle $\theta$ of the outgoing direction code falls within the range of $45° \leq \theta \leq 135°$, code "±" is determined as the WN code; if the incoming direction code represents a 315° direction and angle $\theta$ of the outgoing direction code is 180°, code "0" is determined as the WN code; and if the incoming direction code represents a 315° direction, and angle $\theta$ of the outgoing direction code falls within the range of $225° \leq \theta \leq 360°$, code "+" is determined as the WN code.

7) If the incoming direction code represents a 0° direction, and angle 8 of the outgoing direction code falls within the range of $0° < \theta \leq 180°$, code "−" is determined as the WN code; and if the incoming direction code represents a 0° direction and angle $\theta$ of the outgoing direction code falls within the range of $225° \leq \theta \leq 360°$, code "0" is determined as the WN code.

8) If the incoming direction code represents a 45° direction, and angle $\theta$ of the outgoing direction code falls within the range of $45° \leq \theta \leq 180°$, code "−" is determined as the WN code; if the incoming direction code represents a 45° direction and angle $\theta$ of the outgoing direction code is 225°, code "±" is determined as the WN code; and if the incoming direction code represents a 45° direction, and angle $\theta$ of the outgoing direction code falls within the range of $270° \leq \theta \leq 360°$, Code "0" is determined as the WN code.

As is apparent from the above description, when the incoming direction code represents a 0° direction and angle $\theta$ of the outgoing direction code falls within the range of $0° < \theta \leq 180°$, as shown in FIG. 15, a lattice dot immediately below the current object dot represented by symbol o falls outside a contour black area. The current object dot falls within the black area, as described above. Therefore, code "−" is generated at the current object dot in accordance with the WN code definition. However, when angle $\theta$ of the outgoing direction code falls within the range of $180° < \theta \leq 360°$ while the incoming direction code represents a 0° direction, the lattice dot immediately below the current object dot falls within the black area, and the lattice dot or the previous object dot immediately above the current object dot also falls within the black area. Therefore, no change occurs in data WN before and after the current object dot. In this case, data WN "0" is generated as described above. Data generation for other direction codes can be readily understood by changes in data WN of the current object dot and the previous and next object dots.

Update section 14-3 includes update table 16. Update section 14-3 obtains an updated WN code by referring to update table 16 on the basis of the WN code of the current object dot determined by determination section 14-2 and the WN code of the current object dot stored in WNPM 17, in response to an update command from controller 14-1. The obtained WN code is written at a location in WNPM 17 which corresponds to the current object dot. In this manner, the WN code stored in WNPM 17 is updated.

FIG. 6 shows contents of update table 16. Logic of update table 16 is represented by:

(Updated WN Code)=(WN Code from WNPM 17)+(Determined WN Code)

According to an operation rule of "+" in the above relation, if the determined WN codes are "+" or "−", the WN codes from WNPM 17 are incremented by one or decremented by one respectively, so as to obtain the corresponding updated WN codes. If a decrement or increment result is zero, the updated WN code is changed to "±". If the determined WN code is "±", it is processed as "0" if the WN code is not zero. In this case, the WN code from WNPM 17 is not updated. However, if the WN code from WNPM 17 is "0", the following operation is performed:

"0"+"±"→"±"

Thus, if the determined WN code is "0", updating of the WN code is unnecessary. In this embodiment, when the determined WN code is "0", it is signaled to controller 14-1. In this case, an update command is not output from controller 14-1 to update section 14-3 so as to achieve a high-speed operation. Therefore, update section 14-3 is not operated. In this case, neither update table 16 is referred to nor WNPM 17 is updated. For illustrative convenience, an updated WN code obtained when the determined WN code is "0" is also shown in FIG. 6. However, the updated code need not be calculated in practice. In update table 16 of FIG. 6, a combination corresponding to an entry represented by symbol "*" is not present since overlapping of a maximum of three contours is allowed in this embodiment.

Winding number code pattern memory (WNPM) 17 comprise memories 17-1 and 17-2. In these memories, one word includes 24 bits. Memories 17-1 and 17-2 have a capacity for storing WN codes of a character pattern having a maximum size at a maximum resolution, respectively. Initial values of memories 17-1 and 17-2 are "0"s, respectively. An updated WN code is stored in one of memories 17-1 and 17-2 in WNPM 17, which is set in the update mode. Projection section 14 selects one of memories 17-1 and 17-2 in the update mode in accordance with a selection command from controller 10. The other memory is set in the filling mode by filling processing section 18. While the WN code is updated in one of memories 17-1 and 17-2, the updated WN code can be read out from the other memory. Therefore, determination/updating of the WN code and its filling can be performed by pipelined processing.

Referring to FIG. 3, while the WN code is written in, e.g., memory 17-1 by projection section 14, filling is performed by using the WN code of each dot stored in memory 17-2 in WNPM 17, thereby generating a pattern. Filling processing section 18 sequentially reads out W codes stored in memory 17-2 in WNPM 17 in units of continuous eight dots in the scan line direction, i.e., in units of words. Filling data corresponding to eight dots are generated on the basis of the read-out 8-dot WN codes and corresponding previous line (reference line) winding number data. Filling is performed on the basis of the generated filling data in units of eight dots. This processing is continuously performed by sequentially switching the scan line.

A detailed arrangement of filling processing section 18 and its peripheral circuits will be described in detail with reference to FIG. 4.

Line memory (LM) 19 stores one-line reference line WN data (16 bits/word). The reference line WN data of one dot is given by 2-bit data. One word represents reference line data of eight dots. Bit map memory (page memory) 20 stores character patterns generated by filling processing section 18. In response to transfer ready signal RDY from filling processing section 18, bit block transfer circuit (BITBLT circuit) 21 transfers a byte of filling data to a designated area in bit map memory 20 in accordance with set-up data from controller 10.

Upper address register (UAR) 41 designates an upper address (y-direction address) of memory 17-1 or 17-2. Lower address register (LAR) 42 designates a lower address (i.e., x-direction address representing a word column position in the scan line direction) of memory 17-1 or 17-2. The content of LAR 42 is used to also designate an address of LM 19. +1 circuits 43 and 44 are used to increment the contents of UAR 41 and LAR 42 by one, respectively. Selector 45 selects one of initial value "0" and a value from +1 circuit 43, and selector 46 selects one of the initial value "0" and a value from +1 circuit 44. UAR 41, +1 circuit 43, and selector 45 constitute row address generator 22. LAR 42, +1 circuit 44, and selector 46 constitute column address generator 23.

Differential winding-number register DWR 47 temporarily stores word data, i.e., 24-bit (eight dots) WN codes, read out from WNPM 17 in accordance with the addresses from UAR 41 and LAR 42. Previous line winding-number register PLWR 48 is a 16-bit register for storing word data, i.e., 8-dot previous line or reference line WN data read out from LM 19 in accordance with the low address from LAR 42. Dot generation circuit 49 generates 8-dot data WN and a byte of filling data in accordance with 8-dot WN codes stored in DWR 47 and 8-dot reference line WN data stored in PLWR 48. Pattern register PR 50 is an 8-bit register for storing the 8-dot filling data output from dot generation circuit 49 and supplying it to bit map memory 20. Bus drier BD 51 supplies the 8-dot data WN output from dot generation circuit 49 as new reference line data to LM 19. Filling controller 52 selects one of memories 17-1 or 17-2 in accordance with the memory selection command from controller 10 and controls filling in accordance with a filing start command. When 8-dot filling data is generated, filling controller 52 outputs signal RDY to BITBLT circuit 21.

Figure 7:
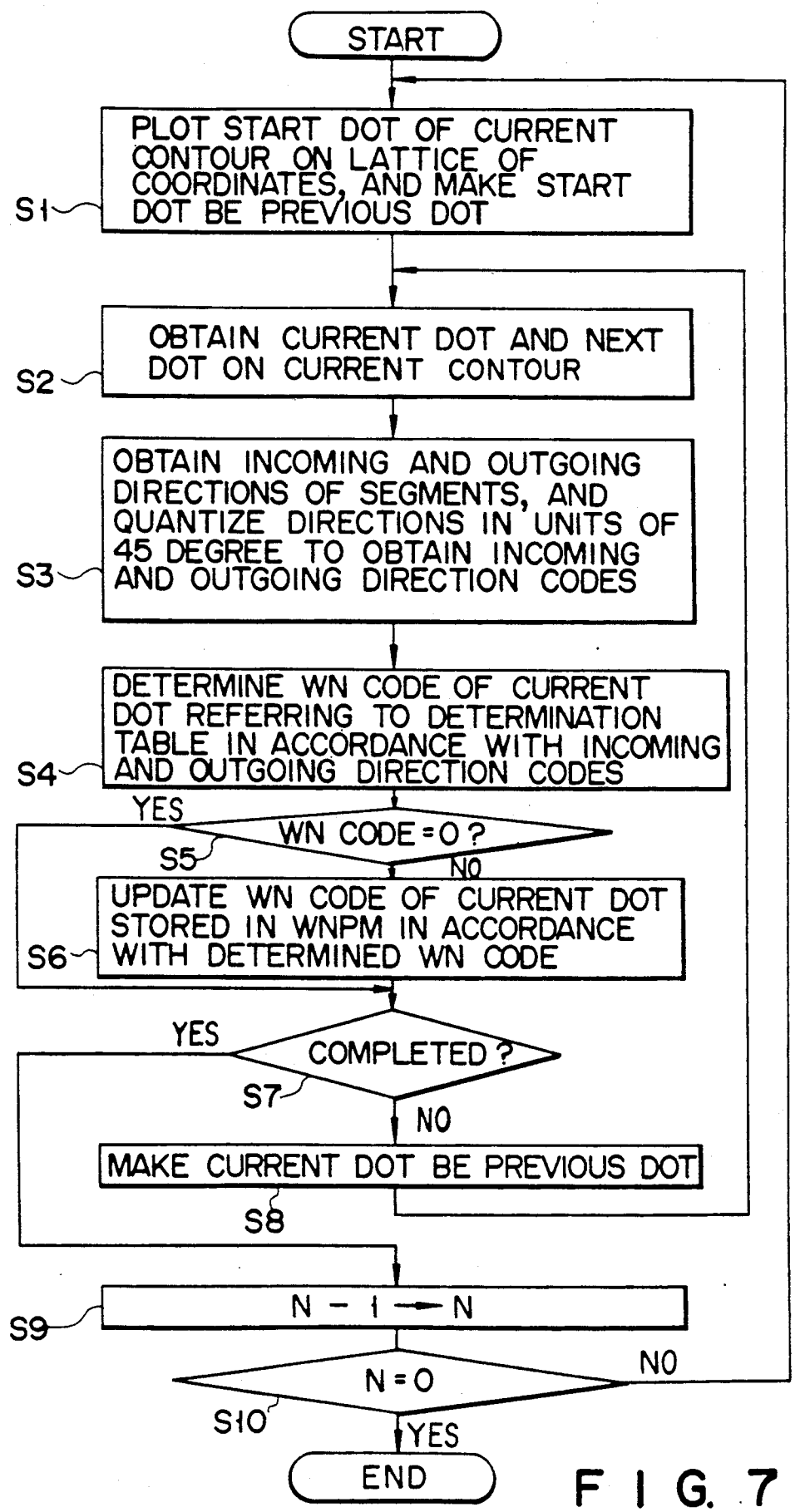
FIGS. 7 and 8 are flow charts for explaining an operation of the first embodiment.
Figure 8:
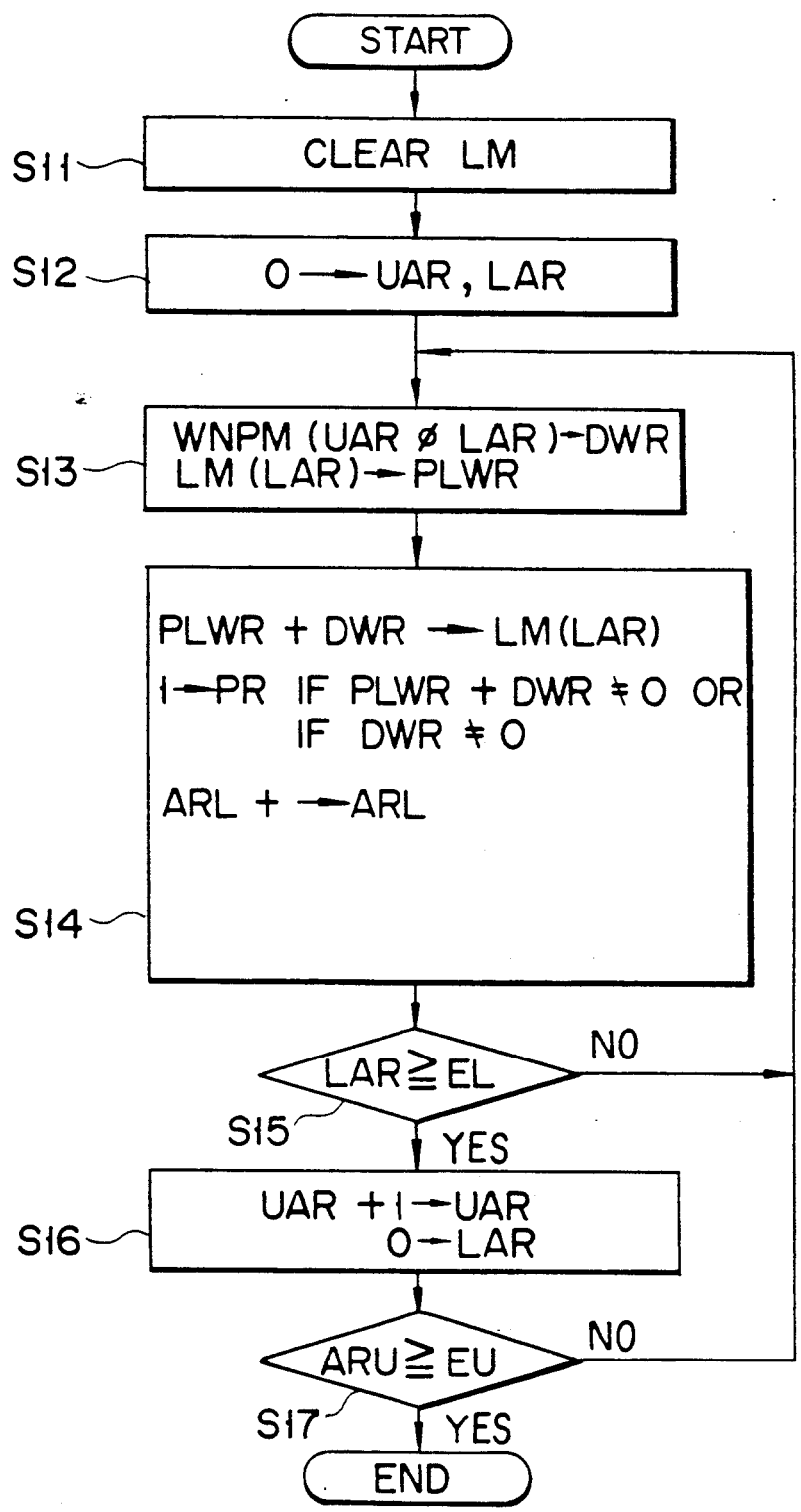

An operation of the first embodiment of the present invention will be described with reference to flow charts in FIGS. 7 and 8.

Figure 9:
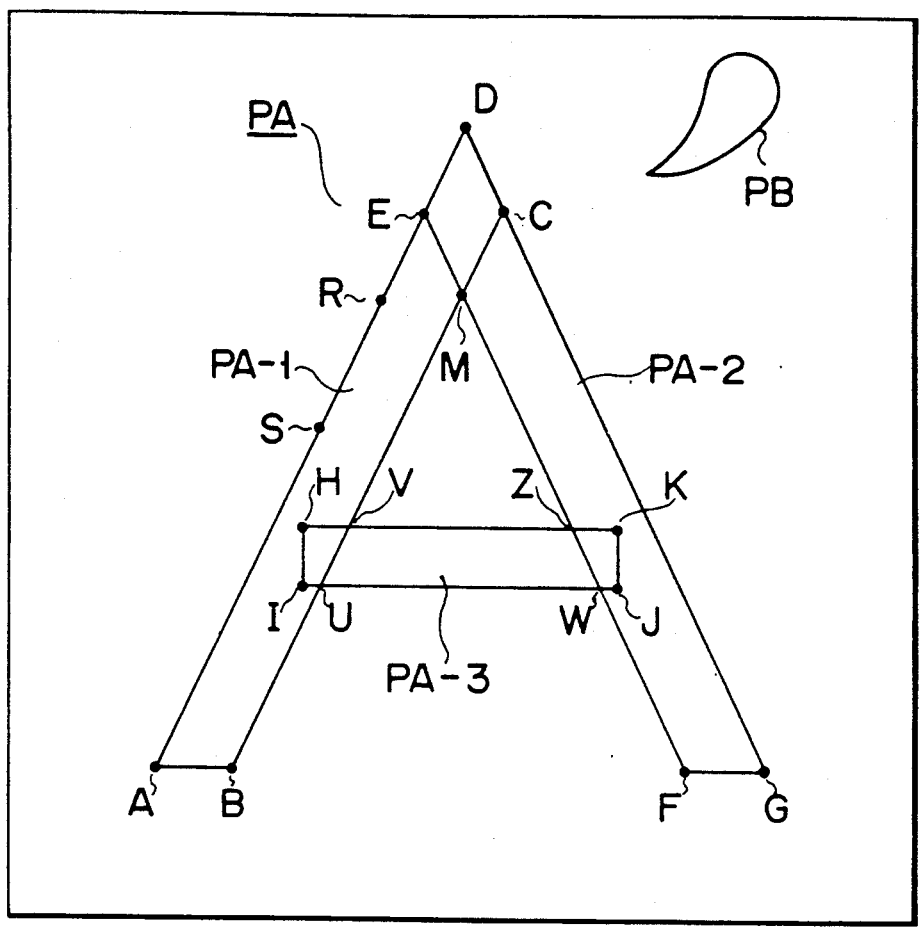
FIG. 9 is a view showing a pattern to be generated.

Assume a pattern generation instruction for generating a pattern shown in FIG. 9 is input to controller 10. In response to the pattern generation instruction, controller 10 outputs a size change command to size change section 12, a memory selection command for selecting one of memories 17-1 and 17-2 to projection section 14, and set-up data to BITBLT circuit 21. Assume that memory 17-1 is currently selected. Pattern definition data for defining character patterns representing desired characters having a standard size are stored in character pattern definition data memory 11. Size change section 12 reads out pattern definition data corresponding to the desired character from pattern definition data memory 11 in response to the size change command from controller 10 and changes the readout pattern definition data so as to define the desired character size. The changed pattern definition data is written in FIFO 13.

Projection section 14 receives the pattern definition data from FIFO 13 in response to a projection start command from controller 10. Pattern count data (2 in this case) of the pattern definition data and contour count data N (3 in this case) of first partial pattern PA in FIG. 9 are latched by projection controller 14-1. Projection of the first contour is started. Subsequently, the first contour line data is received, and the current contour line is designated. In step S1 of FIG. 7, the start dot of the current contour line is plotted by determination section 14-2 on a lattice of coordinates at a resolution determined by the projection start command, and this dot is maintained. Thereafter, the start dot is made to be a previous object dot. In step S2, the next dot is obtained by determination section 14-2 in accordance with a determination command from controller 14-1 and is made to be a current object dot. The current object dot is an intersection of a lattice line and the contour line or a lattice dot approximating the intersection.

Figure 11:
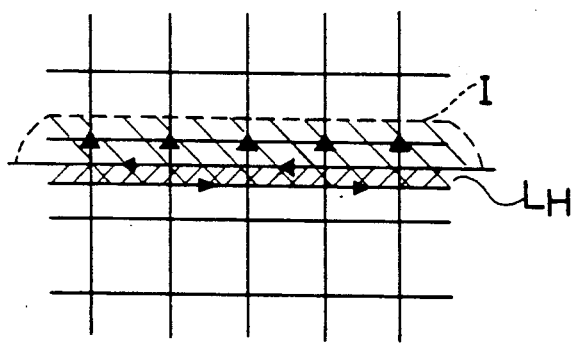
FIG. 11 is a view for explaining a case wherein DDA plotting is applied to reduction of a thin horizontal line pattern.

When a pattern including a thin portion is extremely reduced at the time of generation of the current object dot, partial pattern LH representing the thin portion may pass between adjacent lattice dots due to normal mathematical processing, as shown in FIG. 11. When only the projected lattice dot data WN are used, partial patterns are disconnected or completely disappear when they are parallel to the lattice line. When a partial pattern is reduced into, for example, ½ in size in the horizontal and vertical directions, the black area must be projected to assure continuity of the black area at the time of size reduction. A problem of the disconnected partial patterns will be described wit reference to FIGS. 10A to 10D. A portion shown in FIG. 10A corresponds to a portion between R and S in FIG. 9.

FIG. 10A shows black oblique lines 21 and 21' as part of an extremely reduced partial pattern, and a lattice corresponding to dots to be generated. Referring to FIG. 10A, symbol "·" represents a lattice dot having data WN of "1" in an area to be blackened between lines 21 and 21'. In this case, four black lattice dots are shown in FIG. 10A. FIG. 10B shows a dot arrangement of a partial pattern to be generated. The center of the black area corresponds to the lattice dot in FIG. 10A. For example, lattice dots PA, PB, and PC in FIG. 10A correspond to centers PA', PB', and PB' of dots shown in FIG. 10B, respectively. As is apparent from FIGS. 10A and 10B, when a black dot corresponding to symbol "·" in FIG. 10A is generated, partial patterns are disconnected, as shown in FIG. 10B.

A method of maintaining continuity of areas, which is employed by determination section 14-2, will be described with reference to FIGS. 10C and 10D. This technique is very effective to reduce a black line pattern drawn on a white background.

The same segments as in FIG. 10A, which include black oblique line segments 21 and 21', are illustrated in FIG. 10C. Segment 21 is drawn downward in the left direction, as indicated by an arrow. In the pattern of FIG. 10C, an angle between segment 21 and a line parallel to the y-axis near point PF is smaller than an angle between segment 21 and a line parallel to the x-axis. In this case, intersection PF between lattice line LE in the x direction and segment 21 is obtained, and lattice point PG nearest to point PF is obtained. The black area is expanded such that data WN at point PG is set to be "1", as indicated by the broken line.

As an operation for calculating a dot included in the black area to be expanded, a known linear drawing algorithm called DDA (Digital Differential Analyzer) is used to plot dots representing a straight or curved line on the lattice of coordinates while the 8-dot connecting relationship is kept unchanged. The 8-dot connecting relationship means that the dots are connected to each other according to one of the directions, i.e., upper, lower, right, left, upper right, upper left, lower right, and lower left directions. According to this DDA plotting technique, instead of intersections between segment 21 and a lattice line parallel to the x-axis in the case of FIG. 10A, lattice dots are obtained, as indicated by symbols "·" and "▲" while the 8-dot connecting relationship is kept unchanged. If each obtained dot is originally included in the black area, the black area is not expanded. However, if the obtained dot falls outside the black area, the black area is expanded so as to include the dot, as indicated by the broken line. The above operations are also repeated for segment 21', and lattice dots approximating segment 21' are obtained while the 8-dot connecting relationship is kept unchanged. A scan direction for segment 21' is an upper right direction.

Of all obtained lattice dots, lattice dots included in the expanded area are represented by symbols "▲". When dots corresponding to dots represented by symbols "·" and "▲" are plotted as black dots, the result shown in FIG. 10D is obtained, and therefore the black areas become continuous. In the result of FIG. 10D, a 4-dot connecting relationship is established. However, the 4-dot connecting relationship is not always established, i.e., the four dots are not always located in the upper, lower, right, and left positions. However, even if the line width is extremely reduced the 8-dot connecting relationship of the black dots can be assured by the DDA plotting technique.

When a Chinese character pattern and especially a Ming type character pattern having a thin horizontal line is to be extremely reduced, black area LH representing a horizontal pattern as shown in FIG. 11 is often located between adjacent lattice lines. In this case, when dots are plotted in accordance with lattice dot data WN obtained by normal mathematical techniques, horizontal pattern LH completely disappears. However, in this embodiment employing the DDA plotting technique, when a segment representing an upper boundary of horizontal pattern LH is processed, for example, a black area having data WN of "1" is expanded to surround the lattice dots, as indicated by symbols "▲" in FIG. 11. Therefore, a thin pattern in a character pattern will not disappear.

When step S2 is completed, determination section 14 obtains incoming and outgoing directions of the current object dot of a segment and quantizes them in units of 45° in step S3, thereby determining corresponding direction codes. In step S4, determination table 15 shown in FIG. 5 is referred to according to the two direction codes determined in step S3, i.e., the incoming and outgoing codes, thereby determining a WN code. The determined WN code is any one of "−", "0", "+", and "±".

When the WN code of the current object dot is determined, projection controller 14-1 determines in step S5 whether the WN code is "0". If YES (Y) in step S5, an update command is not output from controller 14-1 to update section 14-3, and step S7 is directly executed. However, if NO (N) in step S5, an update command is output to update section 14-3, and step S6 is executed. In step S6, the WN code is read out from currently designated memory 17-1 in WNPM 17, i.e., from a dot position corresponding to the current object dot by update section 14-3 in response to the update command. Update table 16 shown in FIG. 6 is referred to by using the WN code determined by determination section 14-2 and the WN code read out from memory 17-2. The initial value of the WN code of each point in WNPM 17 is "0". Update section 14-3 stores the WN code from update table 16 in a dot corresponding to the current object dot in memory 17-1. In this manner, the WN code in WNPM 17 is updated.

Logic of update table 16 is given as follows:

(Contents of WNPM 17) = (Contents of WNPM 17) + (Determined WN Code)

According to an operation rule of "+" in the above relation, when the determined WN codes are "+" and "−", the contents (i.e., WN codes prior to updating) of WNPM 17 are incremented by one or decremented by one, respectively. If a calculation result becomes "0", the WN code is changed to be "±". When the determined WN code is "±", the content of WMPM 17 is not updated unless the content of WNPM 17 is "0". When the content of WNPM 17 is "0", the following operation is performed:

"0" + "±" → "±"

When processing in step S6 is performed, the WN codes up to the current object dot of the contour line are stored at the corresponding projected positions in memory 17-1.

Controller 14-1 determines in step S7 whether determination and updating of WN codes of all points of the contour line currently processed are completed. If NO in step S7, the current object dot is made to be the previous object dot in step S8, and step S2 is executed again. However, if Y in step S7, contour count data N is decremented by one in step S9. Controller 14-1 determines in step S10 from decremented contour count data N whether other contour lines to be processed are left. In this example, contour line FGDEF is processed as described above.

When processing of contour line HIJKH is completed, controller 14-1 outputs a projection end response to controller 10. In response to this response, controller 10 outputs a filling start command to filling processing section 18. At the same time, controller 10 outputs a memory selection command for designating memory 17-1. Projection section 14 receives the projection start command for processing pattern PB and the memory selection command for designating memory 17-2. Projection section 14 projects pattern PB in memory 17-2 in response to the projection start command.

An operation of filling processing section 18 will be described with reference to the flow chart in FIG. 8. Filling processing section 18 executes filling processing by using WN codes stored in memory 17-1, of the WN code memories in WNPM 17, designated by the selection command. WN codes of continuous eight dots in the scan line direction are sequentially read out, and filling processing is performed in units of eight dots. 8-dot filling processing is matched with an arrangement of bit map memory 20, word addresses of which are continuously assigned in the scan line direction.

In step S11, filling processing section 18 clears the content of LM 19 to "0" in step S11. In step S12, "0"s are selected from selectors 45 and 46 under the control of controller 52 and are loaded in UAR 41 and LAR 42, respectively. The upper address latched by UAR 41 and the lower address latched by LAR 42 are output to WNPM 17 together with a memory designation bit from controller 52 in step S13. WN codes (24 bits) of eight dots continuous in the horizontal direction are read out in the scan line direction of memory 17-1 and latched by DWR 47. The content of LAR 42 is also used to designate a word position (word column position) of LM 19. Reference line WN data corresponding to the word of LM 19 which is designated by the lower address is read out and latched by PLWR 48. Symbol $\phi$ of "UAR $\phi$ LAR" in step S13 of FIG. 8 represents concatenation of upper and lower addresses latched by UAR 41 and LAR 42.

The reference line WN data and the WN codes latched by PLWR 48 and DWR 47 are supplied to dot generation circuit 49. Dot generation circuit 49 simultaneously adds the WN codes of the eight dots and the reference line WN data, as indicated by "DWR+PLWR" in step S14. The WN code of each dot latched by DWR 47 is one of "−3" to "+3" and "±". WN code "±" is processed as "0" under the above additions. A sum indicated by "DWR+PLWR" represents data WN of each dot. Data WN of eight dots generated by dot generation circuit 49 are output to LM 19 through bus driver 51. In this case, these data WN serve as new reference line WN data which is referred to when the corresponding dots of identical column positions in the next scan line indicated by the content "+1" of UAR 41 are filled. Generated data WN are written in the original word position of LM 19 which is designated by LAR 42. When this embodiment is applied to a system in which a character having a maximum size of 2"×2" is printed at a maximum resolution of 600 DPI (dots/inch), the number of horizontal dots of the character pattern in LM 19 is about 1,200. LM 19 having such a capacity can be realized by a commercially available high-speed static RAM chip. LM 19 may be arranged together with filling processing section 18 into an LSI.

Dot generation circuit 49 checks the sums represented by "DWR+PLWR" and WN codes of DWR 47 in units of dots. A bit of filling data of logic "1" for black display is generated for a dot in which at least the sum or WN code is not set to "0". Filling data bit of logic "0" for white display is generated for a dot in which both the sum and the WN code are "0"s. More specifically, in this embodiment, of all WN codes of eight points latched by DWR 17, the filling data bit of logic "1" for black display is generated for a dot corresponding to the WN code of "non-zero" even if its code is "±". Therefore, the filling data bit of logic "1" is always generated at a dot position on which a contour line is projected, and a black line is not omitted from a thin pattern. If the reference line WN data bit of a given dot of a previous word is "0" and the WN code of the corresponding dot is "±", the filling data bit of logic "1" is generated even if data WN of the current object dot is "0". Therefore, a black line is not omitted from a thin pattern reduced to a size having a one-dot width or less.

When the filling data is generated, ready signal RDY is output from controller 52 in filling processing section 18 to BITBLT circuit 21. Set-up data required for continuously writing the filling data in bit map memory 20 is set in BITBLT circuit 21 at the start of filling processing. The set-up data includes coordinates of write start position P (of bit map memory 20) of the partial pattern subjected to filling processing, an x-direction pitch (byte count EL) and a y-direction pitch (dot count EU), as shown in FIG. 13. The 8-dot filling data is transferred from dot generation circuit 49 to bit map memory 20 through PR 50 in accordance with the ready signal RDY and set-up data.

In step S14, the content of LAR 42 is incremented by one by +1 circuit 44. In step S15, the value of the lower address stored in LAR 4 is compared with word count EL in the scan line direction of memory 17-1. If the value stored in LAR 42 is smaller than word count EL, the flow returns to step S13. However, if the value stored in LAR 42 is equal to or larger than word count EL, step S16 is executed. In step S16, the content of UAR 41 is incremented by one by +1 circuit 43, and value "0" is set in LAR 42. In step S17, the value of the upper address stored in UAR 41 is compared with line count EU in the filling direction of memory 17-1. If the value stored in UAR 41 is smaller than line count EU, the flow returns to step S13. However, if the value stored in the UAR 41 is equal to or larger than line count EU, filling processing for one pattern is completed.

BITBLT circuit 21 sequentially writes filling data in bit map memory 20 in response to ready signal RDY while the column address is incremented one by one in the scan line direction, as indicated by addresses ①, ②, ③, . . ., ⓘ in FIG. 13. When EL-byte data is completely written the row address is incremented by one, and the column address is returned to the same value as in address ①. Filling data is then written.

According to the above filling processing technique, the set-up data required for filling processing of one partial pattern is set in BITBLT circuit 21 only once. Therefore, high-speed transfer of the filling data to bit map memory 20 by using BITBLT circuit 21 can be facilitated. To the contrary, in a technique for writing the filling data in the filling direction (i.e., the EU direction), new set-up data must be set whenever the filling data having a one-word width is written in the EU direction. When an EL value is large (although EL=3 (bytes) is given in FIG. 13 for illustrative convenience, EL>150 must be given in a system capable of printing a character having a maximum 2"×2" at a maximum resolution of 600 DPI), high-speed transfer is very difficult.

An operation for reducing a pattern shown in FIG. 12A into ⅓ in size will be described below. First, WN codes for an upper contour line are generated. In this case the states of WN codes of the respective dots of the upper contour line are indicated by codes "+" in FIG. 12B. WN codes for a lower contour line are then generated. When WN code updating is required, the upper and lower contour lines may overlap each other as a result of reduction, and the final states of the WN codes of the respective dots of the pattern are shown in FIG. 12C. When filling processing is performed on the basis of the WN codes shown in FIG. 12C, a line having a one-dot width indicated by code "±" in FIG. 12C can be accurately generated.

In this embodiment, dots whose upper and lower adjacent dots can be black, i.e., dots P1 and P2 without WN code symbols in FIGS. 14A and 14B, are not subjected to WN code updating, as is apparent from the operation of projection section 14. Therefore, unnecessary access of WNPM 17 does not occur. In a pattern having a onedot tip, dot P3 is represented by a WN code of "±", as shown in FIG. 14B. Therefore, correct filling can be performed as in the case shown in FIGS. 12B and 12C.

A pattern generator according to a second embodiment of the present invention will be described below. The arrangement and operation of the second embodiment are substantially the same as those of the first embodiment, and only differences therebetween are described below.

In the second embodiment, overlapping of contour lines is not allowed. In order to generate pattern PA shown in FIG. 9, the pattern is defined by contour lines ABUWFGDA and contour lines MVZM. Since overlapping of contour lines is not allowed, the contents of the update table are given as shown in FIG. 16. As is apparent from FIG. 16, the update table shown in FIG. 16 is the same as a table obtained by extracting a −1 to +1 portion and a ± portion from the update table shown in FIG. 6. Since overlapping of contour lines is not allowed, no answer is given if the WN code read out from memory 17 and the WN code determined by determination section 14-1 are simultaneously "+" or "−".

What is claimed is:

1. An apparatus for generating a high-quality pattern, comprising:
   pattern memory means for storing the pattern;
   code pattern memory means for storing winding number codes, each winding number code substantially corresponding to a coordinate in a lattice of coordinates;

projecting means, responsive to an input projection start command and coupled to the code pattern memory means, for projecting a contour line, including means for updating a plurality of winding number codes stored in the code pattern memory means in accordance with a drawing direction of the contour line relative to a filling direction;

filling means, responsive to an input filling start command and to the code pattern memory means, for filing an area in said pattern memory means in accordance with winding number codes read from said code pattern memory means; and control means for generating the projection start command to said projecting means in response to an input pattern generation instruction and for generating the filling start command to said filling means.

2. An apparatus according to claim 1, further comprising:

definition data memory means for storing contour line data of a standard size; and size changing means for changing the contour line data in accordance with an input size change command to obtain size changed contour line data and generating the size changed contour line data, wherein the projecting means is responsive to the size changed contour line data.

3. An apparatus according to claim 1, wherein said code pattern memory means comprises first and second memory means, said projecting means includes means for selecting one of said first and second memory means in accordance with an input first selection command;

said filling means includes means for selecting the other of said first and second memory means in accordance with an input second selection command; and said control means further comprises means responsive to the projection and response from said projection means, and means for generating the second selection command to said filling means and the first selection command to said projection means.

4. An apparatus according to claim 1, wherein said filling means comprises:

line memory means for storing previous line winding number data;

filling processing means, responsive to the filling start command including first reading means for reading the previous line winding number data from the line memory means;

second reading means for reading winding number codes of a current line from the code pattern memory means;

means, responsive to the first reading means and to the second reading means, for generating current line winding number data and filling data in accordance with the previous line winding number data and the current line winding number codes;

means, responsive to the means for generating, for storing the current line winding number data as the previous line winding number dta in said line memory means including means for generating a ready signal in response to generation of the filling data; and transfer means, responsive to the ready signal from said filling processing means, for transferring the filing data from said filling processing means to said pattern memory in accordance with input set-up data.

5. An apparatus according to claim 4, wherein said filling processing means further includes row address generating means for generating a row address and for generating the row address to said code pattern memory means;

column address generating means for generating a column address and for generating the column address to said line means and said code pattern memory means;

dot generating means for adding the previous line winding number data from said line memory means and the current line winding number codes from said code pattern memory means in accordance with a predetermined rule, including means for storing the added result as the previous line winding number data in said line memory means, and means for generating the filling data in accordance with one of the added result and the current line winding number codes; and filling control means responsive to the filling start command, for controlling said row address generating means, said column address generating means and dot generating means, and for generating the ready signal in response to the generation of the filling data.

6. An apparatus according to claim 1, wherein said projecting means comprises:

determining means responsive to an input determination command, for determining a determined winding number code of a current dot of the contour line in accordance with a first positional relationship between a previous dot and the current dot and a second positional relationship between the current dot and a next dot, and the filling direction;

updating means responsive to an input updata command, including means for reading out the winding number code corresponding to the current dot from said code pattern memory means, means for updating the winding number code in accordance with the determined winding number code from said determining means, and means for storing an updated winding number code in said code pattern memory means; and projection control, means responsive to the projection start command, including means for sequentially generating the determination and updata commands for all dots representing the contour line, means for generating the determination command to said determining means and the update command to said updating means, and means for generating the projection end response to said control means when the contour line is projected.

7. An apparatus according to claim 6, wherein said updating means comprises:

an update table for storing the updated winding number code with respect to he determined winding number code and the winding number code read from the code pattern memory means; and means for referring to said update table in accordance with the determined winding number code and the winding number code read from said code pattern memory to obtain the updated winding number code and storing the winding number codes in said code pattern memory means.

8. An apparatus according to claim 6, wherein said determining means comprises:
a determination table for storing the determined winding number code with respect to incoming and outgoing direction codes; and
means for generating the incoming direction code from the first positional relationship between the previous and current dots and the outgoing direction code from the second positional relationship between the current and next dots, and for referring to said determination table in accordance with the incoming and outgoing direction codes to obtain the determined winding number code.

9. An apparatus according to claim 8, wherein the determined winding number code is one of a fist code representing no change, a second code representing one increase, a third code representing one decrease, and a fourth code representing simultaneous occurrence of one increase and one decrease.

10. An apparatus according to claim 9, wherein said projection control means further comprises means for inhibiting generation of the update command when the winding number code is the first code.

11. An apparatus according to claim 9, wherein the winding number code of only one dot present in the filling direction is the fourth code.

12. An apparatus according to claim 9, wherein said updating means includes means for inhibiting the change in winding number code read from said code pattern memory when the determined winding number code is the first code, means for incrementing the read winding number code by one when the determined winding number code is the second code, means for decrementing the read winding number code when the determined winding number code is the third code, means for making the updated winding number code to be the fourth code when an operation result is 0, and for inhibiting the change in read winding number code when the determined winding number code is the fourth code.

13. An apparatus according to claim 5, wherein said filling means includes mean for adding the n-dot winding number codes read from said code pattern memory means and n-dot reference line data in units of dots by setting the read winding number code to be 0 when the read winding number code is the fourth code, means for generating N-dot winding number data, ad for generating filling data of the generated N-dot winding number data in accordance with whether the read winding number code is the first code.

14. A method of generating a high-quality pattern, comprising the steps of:
projecting a plurality of contour lines to produce a set of object dots;
obtaining a winding number code representing a difference between winding number data of a current object dot of dots obtained by projecting the contour lines and a dot adjacent to the current object dot in a direction opposite to a filling direction;
obtaining filling data of the current object dot from the WN code of the current object dot by referring to the WN data of the adjacent dot; and
filling the current object dot in accordance with the filling data.

15. A method according to claim 14, wherein the step of obtaining the winding number code includes the substeps of:
obtaining the winding number code of the current object dot from an incoming direction of the contour line to the current object dot and an outgoing direction from the current object dot; and
updating a previous winding number code of the current object dot in accordance with the obtained winding number code.

16. A method according to claim 14, wherein the step of filing the object dot includes the step of obtaining the winding number data of the current object dot by adding the winding number code of the current object dot to the winding number data of the adjacent dot.

17. An apparatus for generating a high-quality pattern, comprising:
first means for obtaining a winding number code representing a difference between winding number data of an object dot of dots obtained upon projection of a contour line and a dot adjacent to the object dot in a direction opposite to a filling direction;
code pattern memory means for storing the obtained winding number code; and
second means for obtaining winding number data of the object dot from the winding number code of the object dot read from said code pattern memory means by referring to the winding number data of adjacent dot, and for filling the object dot in accordance with the obtained winding number data and the read winding number code.

18. An apparatus according to claim 17, wherein said first means includes:
mans for obtaining the winding umber code of the object dot from an incoming direction of the contour line to the object dot and an outgoing direction from the object dot; and
means for updating the winding number code of the object dot stored in said code pattern memory means in accordance with the obtained winding number code of the object dot.

19. An apparatus according to claim 17, wherein said second means includes means for obtaining the winding number data of the object dot by adding the winding number code of the object dot to the winding number data of the adjacent dot.

20. An apparatus according to claim 17, wherein the pattern includes a plurality of partial pattern, said code pattern memory means includes a plurality of memories, said apparatus further including means for causing said first means to store a second partial pattern of the plurality of partial patterns in a second memory of the plurality of memories and causing said second means to fill a first partial pattern of the plurality of partial patterns in accordance with the winding number codes stored in said memory, when said first means completes storage of the winding number codes of the first partial pattern in said first memory.

21. An apparatus for generating a high-quality pattern, comprising:
obtaining means for obtaining a winding number code including
means for representing a difference between winding number data of an object dot having a location corresponding to projection of a contour line and a dot adjacent to the object dot in a direction opposite to a filling direction;

code pattern memory means, responsive to the obtaining means, for storing the obtained winding number code; and projecting means responsive to an input projection start command, for projecting a contour line for defining an area of the pattern in said code pattern memory means while updating the first winding number codes with second winding number codes determined in accordance with a drawing direction of the contour line relative to a filling direction in units of dots representing the contour line, and for generating a projection end response upon completion of projection of the contour line;

filling means responsive to an input filling start command, for filling the area in said pattern memory means in accordance with the first winding number codes read from said code pattern memory means to obtain the pattern; and control means for generating the projection start command to said projection means in response to an input pattern generating instruction and for generating the filling start command to said filling means in response to the projection end response.

22. An apparatus according to claim 21, further comprising:

definition data memory means for storing contour line data of a standard size; and size changing means for changing the contour line data in accordance with an input size change command to obtain size changed contour line data and generating the size changed contour line data, wherein the projecting means is responsive to the size changed contour line data.

23. An apparatus according to claim 21, wherein said code pattern memory means comprises first and second memory means, said projecting means includes means for selecting one of said first and second memory means in accordance with an input first selection command;

said filling means includes mean for selecting the other of said first and second memory means in accordance with an input second selection command; and said control means further comprises means responsive to the projection end response from said projection means, and means for generating the second selection command to said filling means and the first selection command to said projecting means.

24. An apparatus according to claim 21, wherein said filling means comprises:

line memory means for storing previous line winding number data;

filling processing means, responsive to the filing start command including first reading means for reading the previous line winding number data from the line memory means;

second reading means for reading winding number codes of a current line from the code pattern memory means;

means, responsive to the first reading means and to the second reading means, for generating current line winding number data and filling data in accordance with the previous line winding number data and the current line winding number codes;

means, responsive to the means for generating, for storing the current line winding number data as the previous line winding number data in said line memory means including means for generating a ready signal in response to generation of the filling data; and transfer means, responsive to the ready signal from said filling processing means, for transferring the filling data from said filling processing means to said pattern memory in accordance with input stet-up data.

25. An apparatus according to claim 24, wherein said filling processing means further includes row address generating means for generating a row address and for generating the row address to said code pattern memory means;

column address generating means for generating a column address and for generating the column address to said line memory means and said code pattern memory means;

dot generating means for adding the previous line winding number data from said line memory means and the current line winding number codes from said code pattern memory means in accordance with a predetermined rule, including mean for storing the added result as the previous line winding number data in said line memory means, and means for generating the filling data in accordance with one of the deed result and the current line winding number codes; and filling control means responsive to the filing start command, for controlling said row address generating means, said column address generating means and dot generating means, and for generating the ready signal in response to the generation of the filling data.

26. An apparatus according to claim 21, wherein said projecting means comprises:

determining means responsive to an input determination command, for determining the determined winding number code of a current dot of the contour line in accordance with a first positional relationship between a previous dot and the current dot and a second positional relationship between the current dot and a next dot, and the filing direction;

updating means responsive to an input updata command, including means for reading out the winding number code corresponding to the current dot from said code pattern memory means, for updating the winding number code in accordance with the determined winding number code from said determining means, and for storing the updated winding number code in said code pattern memory means; and projection control, means responsive to the projection start command, including means for sequentially generating the determination and updata command for all dots representing the contour line, means for generating the determination command to said determining means and the update command to said updating means, and means for generating the projection end response to said control means when the contour line is projected.

27. An apparatus according to claim 26, wherein said updating means comprises:

an update table for storing the updated winding number code updated with respect to the determined winding number code and the winding number code read from the code pattern memory means; and means for referring to said update table in accordance with the determine winding number code and the winding number code read from said code pattern memory to obtain the updated winding number code and storing the updated winding number codes updated in said code pattern memory means.

28. An apparatus according to claim 26, wherein said determining means comprises:
a determination table for storing the determined winding number code with respect to incoming and outgoing direction codes; and
means for generating the incoming direction code from the first positional relationship between the previous and current dots and the outgoing direction code from the second positional relationship between the current and next dots, and for referring to said determination table in accordance with the incoming and outgoing direction codes to obtain the determined winding number code.

29. An apparatus according to claim 28, wherein the determined winding number code is one of a first code representing no change, a second code representing one increase, a third code representing one decrease, and a fourth code representing simultaneous occurrence of one increase and one decrease.

30. An apparatus according to claim 29, wherein said projection control means further comprises means for inhibiting generation of the update command when the winding number code is the first code.

31. An apparatus according to claim 29, wherein the winding number code of only one dot present in the filling direction is the fourth code.

32. An apparatus according to claim 29, wherein said updating means includes means for inhibiting the change in winding number code read from said code pattern memory when the determined winding number code is the first code, means for incrementing the read winding number code by one when the determined winding number code is the second code, means for decrementing the read winding number code when the determined winding number code is the third code, means for making the updated winding number code to be the fourth code when an operation result is 0, and for inhibiting the change in read winding number code when the determined winding number code is the fourth code.

33. An apparatus according to claim 25, wherein said filling means includes means for adding the N-dot winding number codes read from said code pattern memory means and n-dot reference line data in units of dots by setting the read winding number code to be 0 when the read winding number code is the fourth code, means for generating N-dot winding number data, and for generating filling data of the generated N-dot winding number data in accordance with whether the read winding number code is the first code.

34. A method of generating a high-quality pattern for an apparatus having a memory, a filing means and a control means, comprising the steps of:
projecting a plurality of contour liens to produce a set of object dots;
obtaining a winding number code comprised of a plurality of bits and representing a difference between winding number data of an object dot of dots obtained upon projection of a contour line and a dot adjacent to the object dot in a direction opposite to a filling direction;
storing the obtained winding number code in the memory;
obtaining winding number data of the object dot from the winding number code of the object dot including the substep of
reading from said memory means by referring to the winding number data of an adjacent dot, including the substep of generating a read winding number code; and
filling the object dot in accordance with the obtained winding number data and the read winding number code. pg,60

35. A method according to claim 34, wherein the step of obtaining the winding number code includes the substeps of:
obtaining the winding number code of the current object dot from an incoming direction of the contour line to the current object dot and an outgoing direction from the current object dot; and
updating a previous winding number code of the current object dot in accordance with the obtained winding number code.

36. A method according to claim 34, wherein the step of filling the object dot includes the step of obtaining the winding number data of the current object dot by adding the winding number code of the current object dot to the winding number data of the adjacent dot.

* * * * *

UNITED STATES PATENT AND TRADEMARK OFFICE
CERTIFICATE OF CORRECTION

PATENT NO. : 5,053,759
DATED : October 01, 1991
INVENTOR(S) : Fumitaka Sato

It is certified that error appears in the above-identified patent and that said Letters Patent is hereby corrected as shown below:

```
Claim 1, column 15, line 13, change "filing" to --filling--.
Claim 3, column 15, line 42, change "and" to --end--.
Claim 3, column 15, line 45, change "projection"
to --projecting--.
Claim 4, column 15, line 65, change "dta" to --data--.
Claim 4, column 16, line 3, change "filing" to --filling--.
Claim 5, column 16, line 13, after "line" insert --memory--.
Claim 6, column 16, line 41, change "updata" to --update--.
Claim 6, column 16, line 52, change "updata" to --update--.
Claim 7, column 16, line 62, change "he" to --the--.
Claim 9, column 17, line 17, change "fist" to --first--.
Claim 13, column 17, line 45, change "mean" to --means--.
Claim 13, column 17, line 50, change "ad" to --and--.
Claim 16, column 18, line 12, change "filing" to --filling--.
Claim 18, column 18, line 35, change "mans" to --means--.
Claim 18, column 18, line 35, change "umber" to --number--.
Claim 20, column 18, line 57, before "memory"
insert --first--.
Claim 21, column 19, line 23, after "pattern" change
"generating" to --generation--.
```

UNITED STATES PATENT AND TRADEMARK OFFICE
CERTIFICATE OF CORRECTION

PATENT NO. : 5,053,759
DATED : October 01, 1991
INVENTOR(S) : Fumitaka Sato

It is certified that error appears in the above-indentified patent and that said Letters Patent is hereby corrected as shown below:

Claim 23, column 19, line 43, change "mean" to --means--.
Claim 24, column 19, line 56, change "filing" to --filling--.
Claim 24, column 20, line 11, change "stet-up" to --set-up--.
Claim 25, column 20, line 25, change "mean" to --means--.
Claim 25, column 20, line 29, change "deed" to --added--.
Claim 25, column 20, line 31, change "filing" to --filling--.
Claim 26, column 20, line 45, change "filing" to --filling--.
Claim 26, column 20, line 47, change "updata" to --update--.
Claim 26, column 20, line 58, change "updata" to --update--.
Claim 26, column 20, line 59, change "command" to --commands--.
Claim 27, column 21, line 5, change "determine" to --determined--.

UNITED STATES PATENT AND TRADEMARK OFFICE
CERTIFICATE OF CORRECTION

PATENT NO. : 5,053,759
DATED : October 01, 1991
INVENTOR(S) : Fumitaka Sato

It is certified that error appears in the above-indentified patent and that said Letters Patent is hereby corrected as shown below:

Claim 34, column 22, line 12, change "filing" to --filling--.
Claim 34, column 22, line 14, change "liens" to --lines--.
Claim 34, column 22, line 33, Delete "pg, 60".

Signed and Sealed this

Twenty-first Day of June, 1994

Attest:

BRUCE LEHMAN

Attesting Officer      Commissioner of Patents and Trademarks